Jan. 28, 1964   L. F. BENDER   3,119,399
APPARATUS FOR WASHING MILK CONDUCTING LINES
Filed Jan. 4, 1962   2 Sheets-Sheet 1
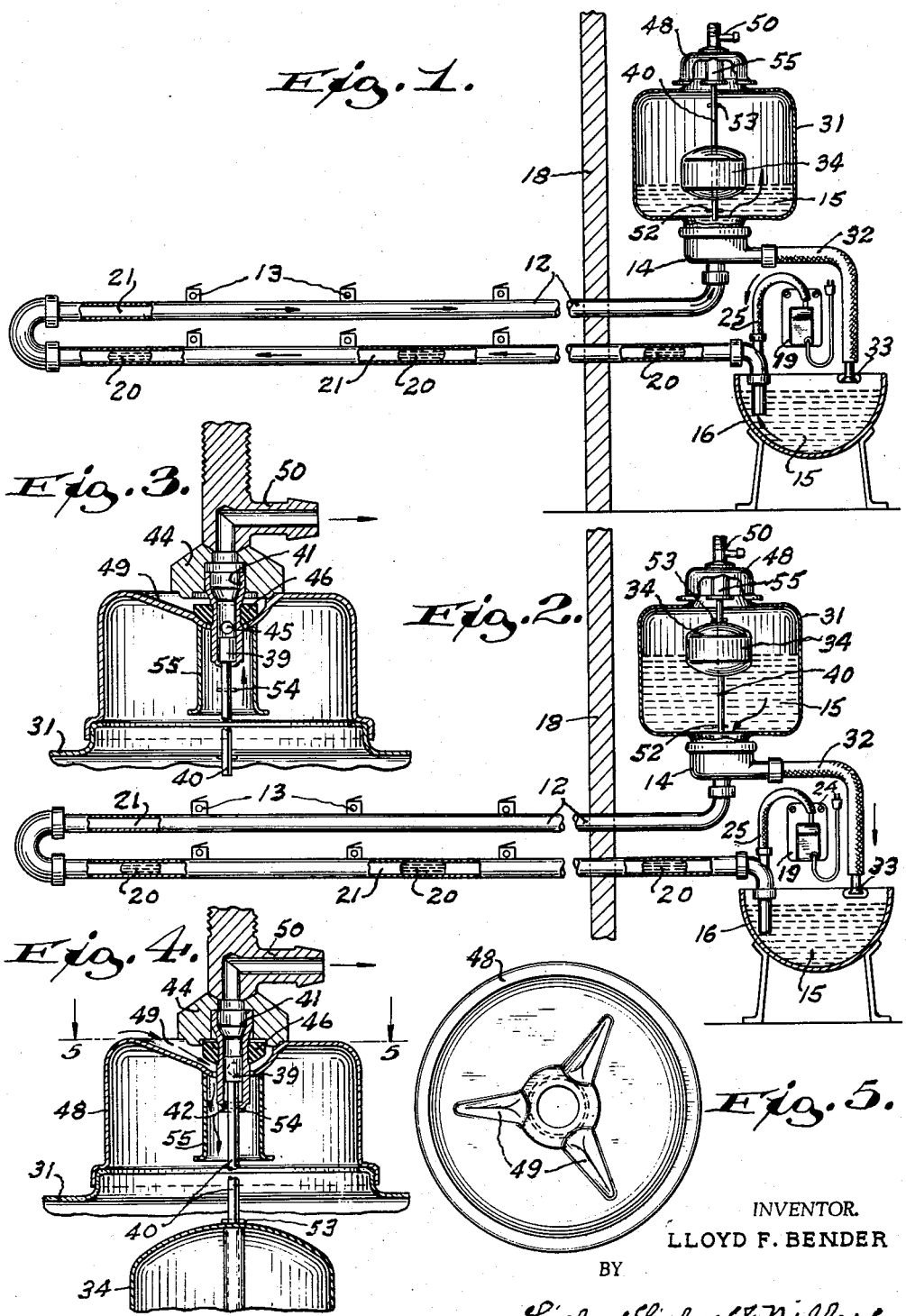
INVENTOR.
LLOYD F. BENDER
BY
Lieber, Lieber & Nilles
ATTORNEYS.

Jan. 28, 1964 L. F. BENDER 3,119,399
APPARATUS FOR WASHING MILK CONDUCTING LINES
Filed Jan. 4, 1962 2 Sheets-Sheet 2
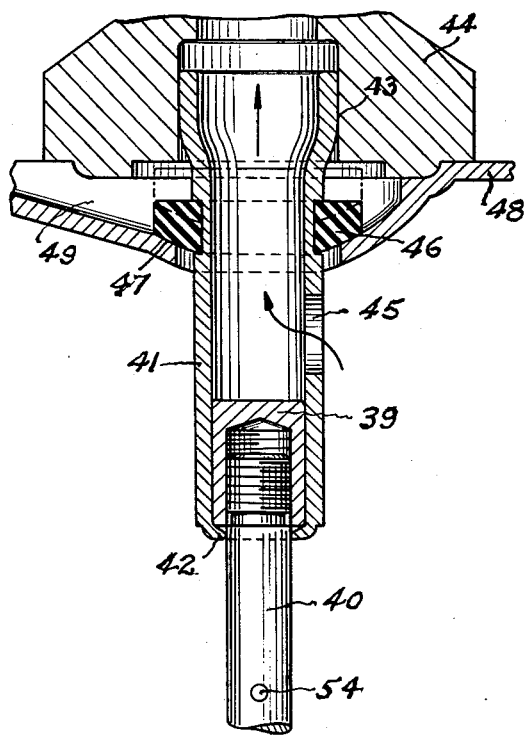
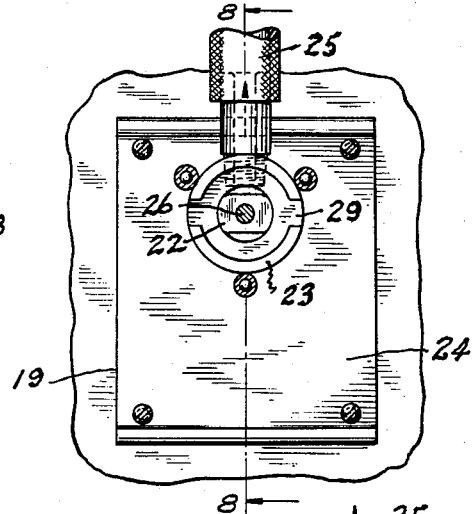
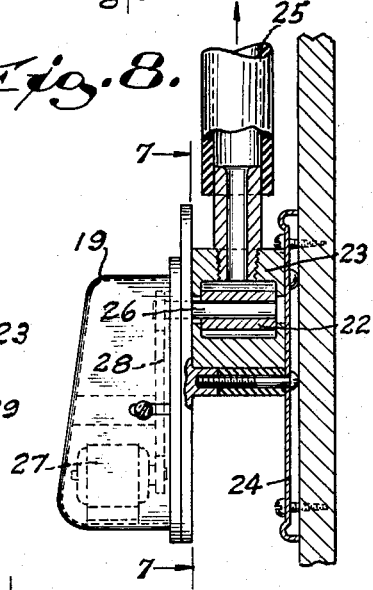
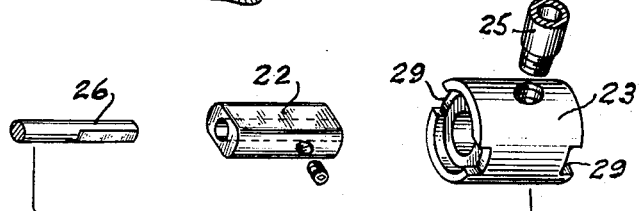
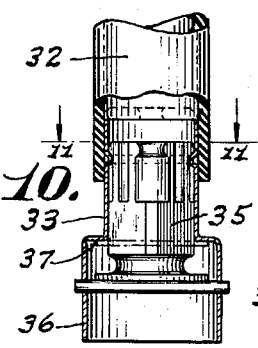
INVENTOR.
LLOYD F. BENDER
BY
Lieber, Lieber & Nilles
ATTORNEYS.

United States Patent Office 3,119,399
Patented Jan. 28, 1964

3,119,399
APPARATUS FOR WASHING MILK CONDUCTING LINES
Lloyd F. Bender, Rte. 2, Hayward, Wis.
Filed Jan. 4, 1962, Ser. No. 164,335
5 Claims. (Cl. 134—56)

The present invention relates to improvements in apparatus for cleansing milk conducting lines and other equipment in dairies or the like, and it relates more particularly to an improved apparatus for washing the main milk collecting and transporting pipe lines of such installations.

The primary object of this invention is to provide a highly efficient apparatus for automatically washing and sterilizing elongated milk conducting lines with the aid of simplified equipment.

It has long been customary to cleanse dairy equipment including the milk conducting lines with which the teat cups are normally associated, with the aid of so-called pipe line washers of the general type comprising a transparent reservoir having a valve at its top operable by a float confined and adapted to ride upon the cleansing liquid within the reservoir to alternately connect the interior of the latter with a source of vacuum and with the ambient atmosphere and to thereby cause cleansing liquid to flow back and forth from a liquid source through the line. Since these prior systems caused the long milk conducting lines to be substantially filled with cleansing liquid while the reservoirs were subjected to vacuum and were being filled, it required the provision of abundant quantities of cleansing liquid in order to effect thorough washing, and since water supplies are very limited in many localities the use of large quantities of liquid is highly objectionable and costly. Then, too, the valve mechanisms of such prior systems are complicated and require a lot of attention in order to maintain the same in sanitary and effective working condition, thus making them further objectionable.

It is therefore an important more specific object of the present invention to provide an improved apparatus for thoroughly washing and sterilizing the milk conducting pipe lines of milking machines with the aid of limited quantities of cleansing solution and water.

Another important object of this invention is to provide an improved apparatus for cleansing a pipe line for milk or the like, by subjecting the interior thereof to a succession of relatively short cleansing liquid slugs separated by much longer air filled spaces, and by advancing the series of spaced liquid slugs with a scouring action through the line at a rapid rate.

A further important object of the invention is to provide an improved milk conveying pipe line washing unit having a cleansing liquid reservoir communicating with one end of the line provided with a simplified float actuated valve for alternately subjecting the reservoir interior with a vacuum source and with the ambient atmosphere, and wherein this valve is cooperable with a timing valve associated with the opposite end of the line operable to alternately connect the latter line end with a source of cleansing liquid and with the ambient atmosphere when the reservoir is being subjected to vacuum.

Still another important object of this invention is to provide various improvements in the construction of apparatus for effectively cleansing milk conducting pipe lines and for effecting the transportation of liquid therethrough while in normal use.

These and other more specific objects and advantages of the invention will be apparent from the following detailed description.

A clear conception of the present improved milk line cleansing system, and of one embodiment of apparatus for effecting practical exploitation of the system, may be had by referring to the drawings accompanying and forming a part of this specification wherein the various parts are designated by suitable reference characters.

FIG. 1 is a diagram of the complete system showing the various parts in action as when cleansing liquid slugs are being successively advanced in spaced relation through a milk conducting pipe line;

FIG. 2 is a similar diagram of the same system but showing the parts in action when returning a batch of cleansing liquid from the washing unit to the cleansing liquid supply tank;

FIG. 3 is a somewhat enlarged central vertical section through the improved vacuum actuated control valve associated with the washing unit of the system, showing the position of this valve when cleansing liquid slugs are being admitted to the pipe line as in FIG. 1;

FIG. 4 is a similarly enlarged section through the same vacuum actuated control valve, but showing the position thereof when a batch of cleansing liquid is being returned to the supply tank as in FIG. 2;

FIG. 5 is a likewise enlarged top view of the upper closure cap of the washing unit;

FIG. 6 is a further enlarged central vertical section through the improved float and vacuum actuated control valve of the washing unit;

FIG. 7 is a vertical section through the timing device for alternately admitting cleansing liquid slugs and air to a pipe line during washing operation, the section being taken along the line 7—7 of FIG. 8;

FIG. 8 is a part sectional side elevation of the same timing device, taken along the line 8—8 of FIG. 7;

FIG. 9 is an exploded view of the timer control valve of the device shown in FIGS. 7 and 8;

FIG. 10 is a part sectional side elevation of the check valve for controlling the discharge of accumulated batches of cleansing liquid from the washing unit; and FIG. 11 is a section through the conduit communicating with the valve of FIG. 10, taken along the line 11—11.

While the invention has been shown and described herein as having special utility when employed for the purpose of washing the milk and conducting lines in dairies, it is not intended to limit its use to such specific purposes since the improvement may be generally applicable for the purpose of cleansing any liquid conducting pipe lines; and it is also contemplated that specific descriptive terms used herein be given the broadest possible interpretation consistent with the disclosure.

In FIGS. 1 and 2 of the drawings which diagrammatically illustrate a system for exploiting the improved method of cleansing dairy equipment, the elongated milk conducting pipe line 12 is provided with a series of teat cup receiving connections 13 and has one end in open communication with a vacuum actuated liquid transporting unit 14 adapted to either convey fresh milk from any source through the line or to transport cleansing liquid therethrough whenever the line is being washed, while the opposite end of the line is either sealed when transporting milk or is immersed within a source of washing and sterilizing liquid 15 confined in a tank 16 during cleansing operations.

The long pipe line 12 may be sixty feet or more in length and extends through and beyond one side of a wall 18 into the cattle housing space containing a series of stalls, while the washing and milk transporting unit 14, the tank 16, and other equipment are located in a room on the opposite side of this wall 18. During washing operations, one end of the pipe line 12 is constantly immersed within the cleansing liquid 15 in the tank 16 while washing of the line is being effected, and the line 12 just beyond this submerged end is provided with an electrically actuated timer 19 adapted to intermittently admit successive slugs 20 of cleansnig liquid 15 separated by atmospheric air filled spaces 21 into the pipe line 12 whenever the interior of the washing unit 14 is subjected to vacuum as shown in FIGS. 1 and 2.

The timer 19 is shown in detail in FIGS. 7, 8, and 9, and comprises a valve plug 22 rotatable within a bore formed in a stationary sleeve 23 mounted upon a fixed support 24, and which is adapted to periodically connect the interior of the pipe line 12 with the ambient atmosphere through a conduit 25 and to alternately cut off this air admission and allow this line to receive successive liquid slugs 20 from the liquid basin 15 due to the vacuum in the unit 14. The plug valve 22 is secured to a shaft 26 adapted to be rotated at predetermined speed by an electric motor 27 through speed reducing gearing 28 as shown in FIG. 8, and when this valve 22 is in the position shown in FIGS. 7 and 8, atmospheric air is sucked into the pipe line 12 through notches 29 in the sleeve 23 and through the conduit 25, whereas such air admission is cut off when the valve plug seals the inlet end of the conduit 25.

The vacuum actuated liquid propelling unit 14 is illustrated in FIGS. 1 to 6 inclusive, and comprises a stationary liquid accumulating reservoir 31 having its lower end portion in open communication with the end of the pipe line 12 remote from the timer 19 and also intermittently communicable with the tank 16 through a liquid return pipe 32 past an automatic check valve 33, while its interior is adapted to be alternately exposed to vacuum and to atmospheric pressure by means of an improved valve assemblage associated with the upper end portion of the reservoir 31 and which is responsive to the position of a float 34 riding upon the liquid 15 in this receptacle. The check valve 33 may be of any suitable type adapted to be closed by atmospheric pressure whenever the interior of the reservoir 31 is subjected to vacuum, and as shown in FIG. 10 this check valve 33 has a plunger 35 reciprocable within a fitting 36 secured to the outlet end of the pipe 32 the fitting having therein a seat 37 with which the plunger 35 is cooperable to close the valve.

The improved float responsive valve assemblage for controlling the admission and release of liquid 15 into and from the interior of the reservoir 31 is shown in detail in FIGS. 3, 4, and 6 and comprises a piston 39 secured to the upper end of a vertically reciprocable rod 40 along which the float 34 is movable as it rises and falls due to the admission and discharge of liquid 15 within the reservoir 31; a valve sleeve 41 within which the piston 39 is reciprocable and which is provided with a lower annular end abutment 42 and with an enlarged upper end 43 snugly slidably confined in a bore formed within a clamping block 44 and has a lateral port 45 therein between its ends; and a disk valve 46 secured to the sleeve 41 and being cooperable with a seat 47 formed on a closure cover 48 for the reservoir 31 provided with air admission ducts 49 and which is normally clamped in position by a vacuum connection 50 coacting with the block 44.

The vertically movable float guiding rod 40 is provided with a pair of lower and upper abutments 52, 53, respectively, with which the float 34 is cooperable to reciprocate this rod centrally within the reservoir 31, and the rod 40 is also provided with an upper stop pin 54 adapted to engage the lower valve confining sleeve abutment 42 whenever the piston 39 has been moved upwardly sufficiently to seal the port 45. The lower portion of the piston confining sleeve 41 may be surrounded by a downwardly open apron 55 secured to the cover 48 but which is spaced from this sleeve so as not to obstruct communication of the port 45 with the interior of the reservoir 31 as shown in FIGS. 3 and 4; and the disk valve 46 which is attached to the sleeve 41 is engageable with the bottom of the clamping block 44 to stop the upward movement of this valve and of the sleeve 41. The vacuum connection 50 may be in constant open communication with any suitable source of vacuum, thus completing the improved pipe line cleansing installation.

When the improved milk and liquid conducting equipment has been properly constructed and installed for use in cleansing the pipe line 12, the milk supplying elements 13 should be closed, and the tank 16 should be provided with a relatively small amount of cleansing and sterilizing liquid 15 sufficient to constantly seal the inlet end of the elongated pipe line but not necessarily sufficient to completely fill this long main line 12. With the reservoir 31 substantially empty so that the float 34 rests upon the lower rod abutment 52 and before the reservoir interior is subjected to vacuum, the check valve 33 will be open, but as soon as the vacuum is applied this check valve will be closed by atmospheric pressure, and the timer 19 should be started to cause the plug valve 22 to open and close at predetermined intervals. This plug valve is so formed that the slugs 20 occupy only a fraction of the space occupied by the intervening air filled spaces 21, but the successive slugs 20 will be advanced in the same direction longitudinally through the pipe line 12 whenever the interior of the reservoir 31 is subjected to vacuum and will reciprocate slightly between the adjacent air spaces 21 to subject the entire pipe line interior to a scouring and through cleansing action.

The successive cleansing liquid slugs 20 are eventually drawn into the reservoir 31 and cause the liquid 15 to accumulate within this reservoir, thereby lifting the float 34 which rides along the rod 40 until it engages the upper abutment 53. As the liquid 15 continues to build up in the reservoir 31, the float 34 lifts the rod 40 and causes the piston valve 39 carried by the upper rod end to seal the port 45 so as to cut off communication of the reservoir interior with the source of vacuum, and promptly thereafter causes the upper pin 54 of the rising rod 40 to engage the lower annular abutment 42 of the valve sleeve 41, thereby lifting this sleeve and opening the disk valve 46. This opening of the valve 46 permits atmospheric air to enter the reservoir 31 through the ducts 49 and also causes the vacuum acting upon the interior of the sleeve 41 and on the piston 39 to hold the rod 40 in uppermost position while simultaneously opening the check valve 33, thus permitting the accumulated liquid to quickly escape by gravity from within the reservoir through the pipe 32 by gravity.

While the reservoir is thus being drained, the pipe line 12 will be subjected to atmospheric pressure, but the liquid slugs 20 confined therein will not be permitted to return freely into the tank 16 since the timer 19 will still be functioning, but most of these washing lugs 20 will surge toward the inlet end of the pipe line and will thus enhance the scouring and cleansing action. As the reservoir 31 is being emptied, the float 34 will drop while the valve disk 46 remains open, until the float engages the lower abutment 52 whereupon the weight of the float will cause the rod 40 to drop and to subsequently open the vacuum port 45 and to close the air valve disk 46, thus placing the installation in condition for repetition of the washing cycle. With the apparatus properly initially conditioned and adjusted, the cleansing and sterilizing cycle will be repeated automatically as long as the timer 19 is functioning and the vacuum connection 50 is communicating with the source of vacuum.

From the foregoing detailed description of the construction and operation of a commercial installation, it should be apparent that the present invention in fact provides an improved method of effecting thorough cleansing of long pipe lines with the aid of limited quantities of washing liquid and water used in producing such liquid. The method can obviously be exploited with simple and automatically functioning apparatus which requires no attention after being initially properly conditioned and adjusted, and the timer plug valve 22 and check valve 39 cooperate with the vacuum and air inlet valves 39, 46 to produce an effective scouring and cleansnig action within the pipe line 12. The improved vacuum control valve is also of utmost simplicity and dependability and causes the slugs 20 to reciprocate as they proceed through the pipe line and to thereby produce a thorough scrubbing action on the interior of the entire pipe line, and this improved method and apparatus have proven highly satisfactory and successful in actual use. It is also noteworthy that whenever the timer valve plug 22 is closed, it provides an air lock for preventing the liquid slugs 20 from returning directly from the pipe line 12 to the tank 16 without passing through the unit 31.

Various modes of carrying out the invention are contemplated as being within the scope of the following claims particularly pointing out and distinctly claiming the subject matter which is regarded as the invention.

I claim:

1. A milk line cleansing system comprising, means operatively associated with one end of the line for alternately connected the line interior with a source of vacuum and with the ambient atmosphere, a source of cleansing liquid communicable with the opposite end of the line, and intermittently operable means for alternately admitting slugs of cleansing liquid from said liquid source and air from the ambient atmosphere into said opposite line end whenever the line interior is connected to said vacuum source.

2. A milk line cleansing system comprising, means operatively associated with one end of the line for alternately connecting the line interior with a source of vacuum and with the ambient atmosphere, a source of cleansing liquid communicable with the opposite end of the line, and intermittently operable means for alternately admitting relatively small slugs of cleansing liquid from said liquid source and larger quantities of air from the ambient atmosphere into said opposite line end to create a succession of slugs and air gaps advancing along the line whenever the interior thereof is connected to said vacuum source.

3. A milk line cleansing system comprising, a float controlled valve operatively associated with one end of the line for alternately connecting the line interior with a source of vacuum and with the ambient atmosphere, a source of cleansing liquid communicable with the opposite end of the line, and an intermittently operable valve alternately operable to admit relatively small slugs of cleansing liquid from said liquid source and larger quantities of air from the ambient atmosphere into said opposite line end to create a succession of slugs and air filled gaps advancing along the line whenever the interior thereof is connected to said vacuum source.

4. A milk line cleansing system comprising, a liquid reservoir, a float actuated valve operable to alternately connect the interior of said reservoir and one end of said line with a source of vacuum and with the ambient atmosphere, a source of cleansing liquid communicable with the opposite end of the line, and an intermittently operable timing device for alternately admitting slugs of cleansing liquid from said liquid source and air from the ambient atmosphere into said opposite line end whenever said reservoir and the line interior are connected to the vacuum source.

5. Apparatus for cleansing a milk conducting pipe line, which comprises, a liquid accumulating reservoir communicating with one end of the pipe line and with a source of vacuum, a tank containing sufficient cleansing liquid to constantly submerge the opposite end of the pipe line, a timing device operable to intermittently admit quantities of air into said opposite line end, and a float actuated valve for alternately controlling the evacuation and admission of air from and to said reservoir to cause successive batches of cleansing liquid to advance through the pipe line.

References Cited in the file of this patent

UNITED STATES PATENTS

| | | |
|---|---|---|
| 1,549,566 | Bain | Aug. 11, 1925 |
| 1,835,035 | Fraser | Dec. 8, 1931 |
| 2,784,120 | Hagedorn | Mar. 5, 1957 |
| 2,786,000 | Roach | Mar. 19, 1957 |
| 2,818,076 | Erling | Dec. 31, 1957 |
| 2,897,827 | Dromgold | Aug. 4, 1959 |
| 2,897,828 | Bender | Aug. 4, 1959 |
| 2,997,049 | Thomas | Aug. 22, 1961 |